United States Patent
Ohgake (10) Patent No.: US 7,092,949 B2
(45) Date of Patent: *Aug. 15, 2006

(54) RECORDING MEDIUM HAVING A PLURALITY OF SECTIONS STORING ROOT DIRECTORY INFORMATION

(75) Inventor: Mitsuru Ohgake, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 211 days.

This patent is subject to a terminal disclaimer.

(21) Appl. No.: 09/793,132

(22) Filed: Feb. 27, 2001

(65) Prior Publication Data

US 2001/0018688 A1  Aug. 30, 2001

(30) Foreign Application Priority Data

Feb. 28, 2000  (JP) .............................. 2000-050394

(51) Int. Cl.
*G06F 17/30* (2006.01)
(52) U.S. Cl. ...................... 707/100; 707/101; 707/205
(58) Field of Classification Search .................. 707/9, 707/200, 201, 205, 101; 705/54, 52; 709/229; 711/112, 114; 237/12.1; 369/59.25
See application file for complete search history.

(56) References Cited

U.S. PATENT DOCUMENTS

| | | | | |
|---|---|---|---|---|
| 4,528,643 A | * | 7/1985 | Freeny, Jr. .................. 705/52 |
| 4,791,623 A | * | 12/1988 | Deiotte .................... 369/59.25 |
| 5,465,381 A | * | 11/1995 | Schmidt et al. ............. 711/112 |
| 5,629,980 A | * | 5/1997 | Stefik et al. ................... 705/54 |
| 5,649,185 A | * | 7/1997 | Antognini et al. ............. 707/9 |
| 5,887,163 A | * | 3/1999 | Nguyen et al. ................ 713/2 |
| 5,903,732 A | * | 5/1999 | Reed et al. ................. 709/229 |
| 6,453,420 B1 | * | 9/2002 | Collart ...................... 237/12.1 |
| 6,629,203 B1 | * | 9/2003 | Humlicek .................... 711/114 |
| 6,751,625 B1 | * | 6/2004 | Ohgake ..................... 707/101 |

FOREIGN PATENT DOCUMENTS

| | | |
|---|---|---|
| JP | 5-257816 | 10/1993 |
| JP | 6-295521 | 10/1994 |
| JP | 11-134650 | 5/1999 |
| JP | 11-134719 | 5/1999 |
| JP | 11-134813 | 5/1999 |
| WO | WO 98/29869 | 7/1998 |

* cited by examiner

*Primary Examiner*—Jeffrey Gaffin
*Assistant Examiner*—Neveen Abel-Jalil
(74) *Attorney, Agent, or Firm*—Dickstein Shapiro Morin & Oshinsky LLP (57) ABSTRACT

A recording medium can store data which can be accessed exclusively by a particular person in a general circumstance of using a recording medium such as a personal computer circumstance. The recording medium stores the data having a directory structure. A first set of root directory information is recorded in a first section. A second set of root directory information is recorded in a second section located at a predetermined position different from the position of the first section. The first set of root directory information is a part of the second set of root directory information.

9 Claims, 5 Drawing Sheets

RECORDING MEDIUM HAVING A PLURALITY OF SECTIONS STORING ROOT DIRECTORY INFORMATION

BACKGROUND OF THE INVENTION

1. Field of the Invention

The present invention generally relates to a recording medium such as a compact disc and, more particularly, to a recording medium for storing information to be protected from an unauthorized access.

2. Description of the Related Art

In recent years, portable optical discs having a large capacity have become popular as a recording medium used with a personal computer. A read only type compact disc (CD-ROM) has become very popular. A recordable compact disc (CD-R) or a rewritable compact disc (CD-RW) is a typical recordable recording medium used with a personal computer.

In many cases, information recorded on a recording medium such as a CD-R or a CD-RW is created by the owner of the recording medium so as to be used by the owner or limited persons authorized by the owner. Additionally, in some cases, information recorded on the recording medium contains very important contents such as secret business information. Thus, a damage due to lost of such a recording medium or an unauthorized access to such a recording medium is inestimable.

Additionally, it has become important to protect information recorded on a CD-ROM from an illegal copy in light of copyright.

Accordingly, various techniques have been suggested to prevent illegal use of such a recording medium. In order to prevent an illegal access to information (programs or data) recorded on a recording medium or an illegal copy of such information, Japanese Laid-Open Patent Applications No.5-257816 and No.6-295521 disclose protecting methods using a licensing key (individual number key) or an enciphering technique.

Additionally, Japanese Laid-Open Patent Applications No.11-134650, No.11-134719 and No.11-134813 suggest measures taken for a recording method of a recording medium or a recording and reproducing apparatus.

However, practically in a data processing apparatus such as a personal computer using an operating system, there are many cases in which a recording medium is mounted on an apparatus. In this case, the term "be mounted on" means that a recording or reproducing operation with respect a recording medium can be performed through a drive apparatus due to predetermined information (for example, root directory information defined as a normal file system) recorded at a predetermined position of the recording medium. That is, an access can be made to information recorded on a recording medium by controlling the drive apparatus for reading or writing the recording medium. Thus, the above mentioned methods using the licensing key or enciphering technique are not so effective. Additionally, enciphered information may be illegally used by analyzing the enciphering algorithm.

On the other hand, if the measures suggested in Japanese Laid-Open Patent Applications No.11-134650, No.11-134719 and No.11-134813 are to be taken, such measures cannot be applied to recording and reproducing apparatuses that are already on the market. Thus, such measures must be applied to a new apparatus, and there needs a time to introduce such a new apparatus into the market.

SUMMARY OF THE INVENTION

It is a general object of the present invention to provide an improved and useful recording medium in which the above-mentioned problems are eliminated.

A more specific object of the present invention is to provide a recording medium having information which can be accessed exclusively by a particular person in a general circumstance of using a recording medium such as a personal computer circumstance.

Another object of the present invention is to provide a method for accessing a recording medium on which data is recorded according to a directory structure, the data recorded on the recording medium being protected from being accessed by an unauthorized person.

In order to achieve the above-mentioned objects, there is provided according to one aspect of the present invention a recording medium storing data having a directory structure, comprising: a first section in which a first set of root directory information is recorded; and a second section in which a second set of root directory information is recorded, the second section being located at a predetermined position different from a position of the first section, wherein the first set of root directory information is a part of the second set of root directory information.

According to the present invention, the contents of data recorded on the recording medium is presented to a user by accessing the first root directory information which is a part of the second root directory information. When the contents of the first root directory information is shown in accordance with the first root directory information, only a part of the contents of the data recorded on the recording medium is shown. Thus, the user cannot access the contents of which information is not included in the first root directory information.

In the recording medium according to the present invention, the first set of root directory information may indicate that only a root directory is present, and the second set of root directory information indicates all directories and files of the data recorded on the recording medium.

Accordingly, if the first set of root directory information is accessed by an unauthorized person and the second set of root directory can be accessed only by an authorized person, the data recorded on the recording medium can be accessed only by the authorized person. If the unauthorized person attempts to access the data recorded on the recording medium, only a root directory is presented to the unauthorized person. Accordingly, the data recorded on the recording medium is prevented from being accessed by an unauthorized person.

Additionally, in the recording medium according to the present invention, recording medium discrimination information may be recorded at a predetermined position on the recording medium, the recording medium discrimination information indicating whether or not the second set of root directory information is recorded. Thus, if the recording medium discrimination information is recorded on the recording medium, an attempt can be made to read the second root directory information to access the whole data recorded on the recording medium.

Additionally, in the recording medium according to the present invention, root directory position information is recorded at a predetermined position on the recording medium, the root directory position information indicating a position of the second section. Accordingly, the second root directory information can be accessed by reading the root directory position information.

Additionally, in the recording medium according to the present invention, root directory access information may be recorded at a predetermined position specified in an existing standard, the root directory access information indicating the position of the first section. Accordingly, the recording medium according to the present invention can be read by a conventional drive apparatus, which is operated according to the existing standard. However, since only the first root directory information can be accessed by the conventional drive apparatus, the data recorded on the recording medium cannot be accessed by the conventional drive apparatus.

Additionally, there is provided according to another aspect of the present invention a method for accessing a recording medium, comprising the steps of: discriminating whether the recording medium has both a first set of root directory information and a second set of root directory information, the first set of root directory information indicating only a root directory of data recorded on the recording medium, the second set of root directory information indicating all directories and files of the data recorded on the recording medium; determining whether a person, who is accessing the recording medium, is an authorized person when the recording medium has the second sets of root directory information; and reading root directory position information recorded at a predetermined position on the recording medium only when the person is determined to be the authorized person, the root directory position information indicating a position at which the second set of root directory information is recorded.

The method according to the present invention may further comprise a step of reading root directory access information recorded at a predetermined position on the recording medium when the person is determined to be an unauthorized person, the root directory access information indicating a position at which root directory information containing information with respect to only a root directory of the data recorded on the recording medium is recorded.

Additionally, the step of discriminating may include a step of reading recording medium discrimination information recorded at a predetermined position on the recording medium, the recording medium discrimination information indicating whether or not the second set of root directory information is recorded.

The method according to the present invention may further comprise a step of reading root directory access information recorded at a predetermined position on the recording medium when the recording medium does not have the second set of directory information, the root directory access information indicating a position at which the first set of root directory information is recorded.

Additionally, the step of determining may include the steps of: requesting the person to input certification information; and determining whether or not the certification information is correct so that the person is determined to be the authorized person when the certification is correct.

Other objects, features and advantages of the present invention will become more apparent from the following detailed description when read in conjunction with the accompanying drawings.

DETAILED DESCRIPTION OF THE PREFERRED EMBODIMENT

A description will now be given, with reference to the drawings, of an embodiment of the present invention.

Figure 1:
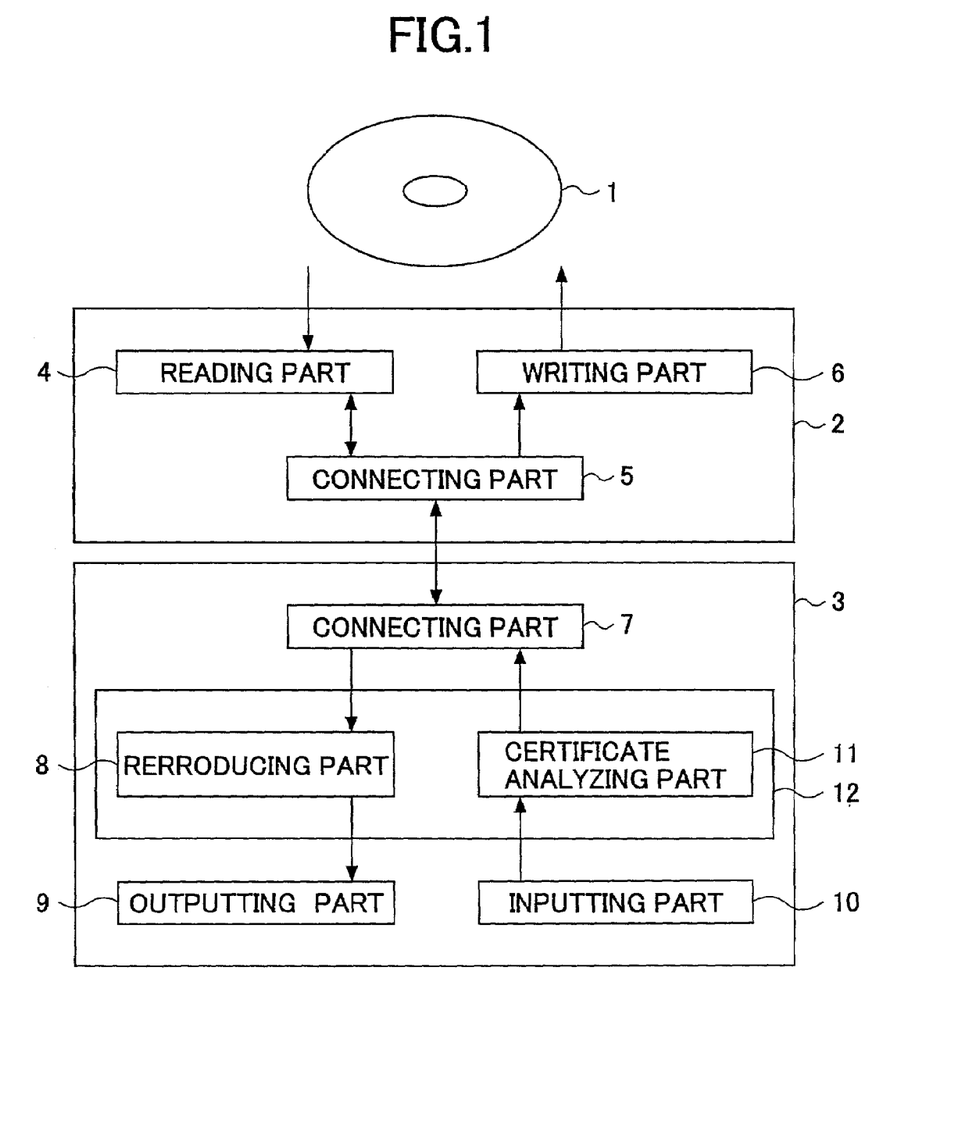
FIG. 1 is a block diagram of an optical disc apparatus that performs an accessing method according to an embodiment of the present invention.

FIG. 1 is a block diagram of an optical disc apparatus that performs an accessing method according to an embodiment of the present invention. The optical disc apparatus shown in FIG. 1 writes information on and reads information from a recording medium such as an optical disc 1. The optical disc apparatus comprises a drive apparatus 2 on which the optical disc 1 is mounted and an information processing apparatus 3 that exchanges information with the drive apparatus 2 and performs other processes.

The optical disc 1 can be a read only compact disc CD-ROM, a recordable compact disc CD-R or a rewritable compact disc CD-RW. Thus, the drive apparatus 2 may be a CD-ROM drive having a reading function or a CD-R/RW drive having a writing function. The drive apparatus 2 and the information processing apparatus 3 may be incorporated into a single unit.

The drive apparatus 2 comprises a reading part 4 as reading means and a connecting part 5 as connecting means. The reading part 4 optically reads information recorded on the optical disc 1 by an optical pickup. The connecting part 5 connects the information processing apparatus 3 to the drive apparatus 2. When the drive apparatus 2 is a CD-R/RW apparatus having a writing function, a writing part 6 having an optical pickup as writing means is provided in the drive apparatus 2 so as to write information on the optical disc 1 in accordance with a write instruction provided from the information processing apparatus 3.

The information processing apparatus 3 comprises connecting part 7 as connecting means, a reproducing part 8 as reproducing means, an output part 9 as output means, an input part 10 as input means, and a certificate analyzing part 11 as certificate analyzing means. The connecting part 7 connects the information processing apparatus 3 with the connecting part 5 of the drive apparatus 2. The reproducing part 8 processes various information read from the optical disc 1. The output part 9 outputs the information reproduced by the reproducing part 8. A user accessing the optical disc 1 supplies information such as certificate information through the input part 10. Certificate analyzing part 11 analyzes whether or not the certificate information input through the inputting part 10 is correct. In the present embodiment, software 12 for using a recording medium is installed in the information processing apparatus 3 so as to control an access to the optical disc 1 mounted on the drive apparatus 2 by controlling operations of the reproducing part 8 and the certificate analyzing part 11.

Figure 2A:
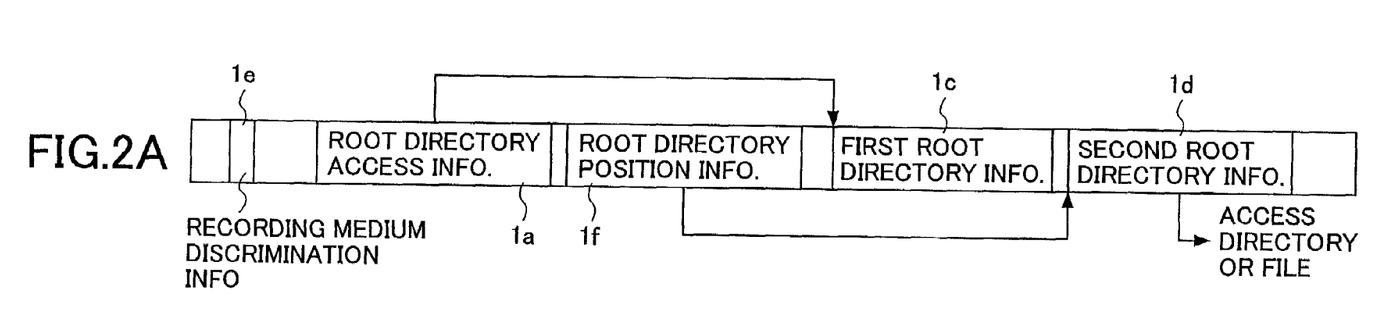
FIG. 2A is an illustration of an arrangement of root directory information recorded on an optical disc according to the embodiment of the present invention.
Figure 2B:
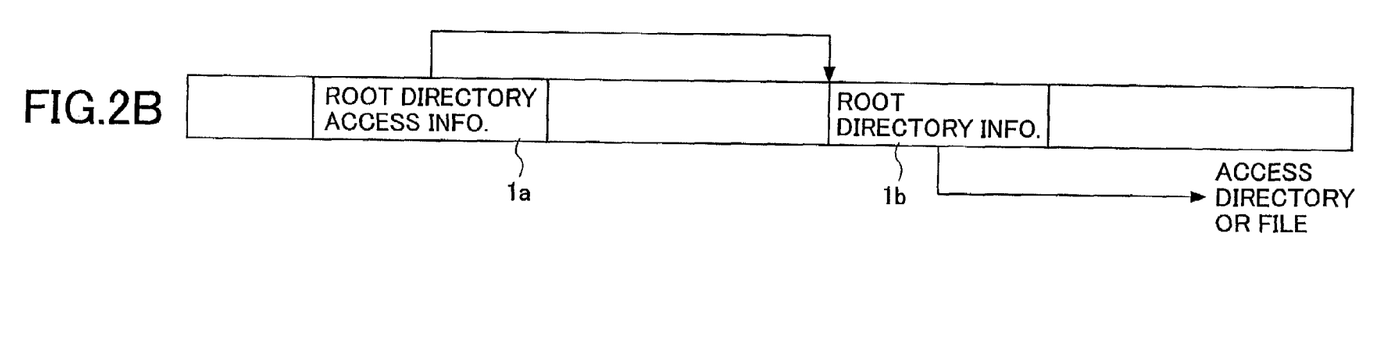
FIG. 2B is an illustration of an arrangement of root directory information recorded on an optical disc according to a recording method specified by an existing standard.

A description will now be given, with reference to FIGS. 2A and 2B, of an information storing structure of the optical disc 1. FIG. 2A illustrates an arrangement of root directory information recorded on the optical disc 1 according to the embodiment of the present invention. FIG. 2B illustrates an arrangement of root directory information recorded on the optical disc 1 according to a recording method specified by an existing standard.

The arrangement of information recorded on the optical disc 1 shown in FIG. 2B is in accordance with a recording method specified by an existing standard such as an ISO9660 file system or a Universal Disc Format (UDF) file system. The root directory access information is stored in a section or area 1a starting from a predetermined position. For example, the directory access information is stored in the Primary Volume Descriptor according to the ISO file system, or stored in the File Set Descriptor (FDS) according to the UDF file system. Additionally, the root directory information is stored in a section or area 1b different from the section or area 1a storing the root directory access information. Pointer information indicating the start address of the sector or area 1b storing the root directory information is included in the root directory access information. Accordingly, the root directory access information is read first, and then the root directory information can be read by referring to the pointer information indicating the start address of the section or area 1b storing the root directory information. The data recorded on the optical disc 1, which includes directories or files, is read by referring to the root directory information.

On the other hand, information recorded on the optical disc 1 shown in FIG. 2A, which is in accordance with the embodiment of the present information, includes additional information such as root directory position information. Additionally, the information recorded on the optical disc 1 shown in FIG. 2A includes two sets of root directory information such as first root directory information and second root directory information. Further, the information recorded on the optical disc 1 shown in FIG. 2A includes recording medium discrimination information, which indicates a type of a recording medium.

The root directory position information is stored in a sector or area 1f starting from a predetermined position (address). Similar to that shown in FIG. 2B, the root directory access information stored in the sector or area 1a includes pointer information indicating a start position (start address) of a section or area 1c in which the first root directory information is stored. Additionally, the root directory position information stored in the sector or area 1f includes pointer information indicating a start position (start address) of a section or area 1d in which the second root directory information is stored. Accordingly, the second root directory information can be read by referring to the pointer information included in the root directory position information stored in the section or area 1f of which position is fixed.

The recording medium discrimination information is stored in a section or area 1e starting from a predetermined position (address). The recording medium discrimination information indicates whether or not the optical disc 1 is of a type which has the root directory position information stored in the section or area 1f. That is, if the recording medium discrimination information is recorded on the optical disc 1, the root directory position information is read by accessing the section or area 1f. Otherwise, the root directory access information stored in the section or area 1a is read so that the first root directory information is read.

Figure 3:
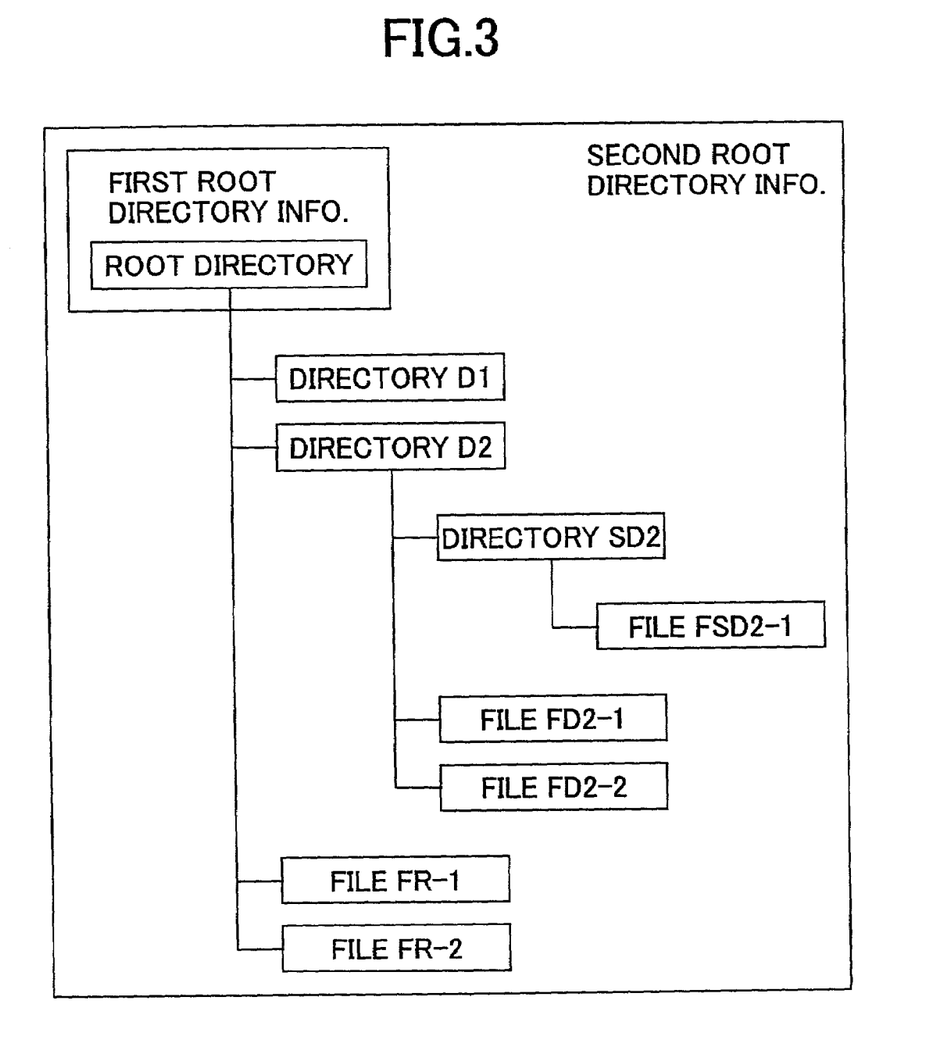
FIG. 3 is an illustration of a directory structure of data recorded on an optical disc.

A description will now be given, with reference to FIG. 3, of the difference between the first root directory information and the second root directory information. FIG. 3 is an illustration showing a directory structure of data recorded on the optical disc 1.

As shown in FIG. 3, the first root directory information is a part of the second root directory information. That is, the first root directory information includes only information regarding a root directory. The second root directory information includes information regarding all directories and files recorded on the optical disc 1.

In the directory structure shown in FIG. 3, the root directory has directories D1 and D2 and files FR-1 and FR-2. Additionally, the directory D2 has a subdirectory SD2 and files FD2-1 and FD2-2. The subdirectory SD2 has a file SD2-1.

The second root directory information includes information regarding all of the directories D1, D2 and SD2 and files FR-1, FR-2, FD2-1, FD2-2 and FSD2-1 that are arranged under the root directory. Thus, any one of the directories or files under the root directory can be accessed by referring to the second root directory information. That is, the whole data recorded on the optical disc 1 can be accessed by referring to the second root directory information, which can be read in accordance with the pointer information included in the root directory position information.

On the other hand, since the first root directory information includes only information regarding the root directory, one cannot merely recognize the root directory by through the first root directory information. That is, the directories and files under the root directory cannot be indicated when the first root directory information is read. Accordingly, when the first root directory information is read, one can recognize as if the optical disc 1 has only the root directory and there is no data recorded on the optical disc 1.

Figure 4:
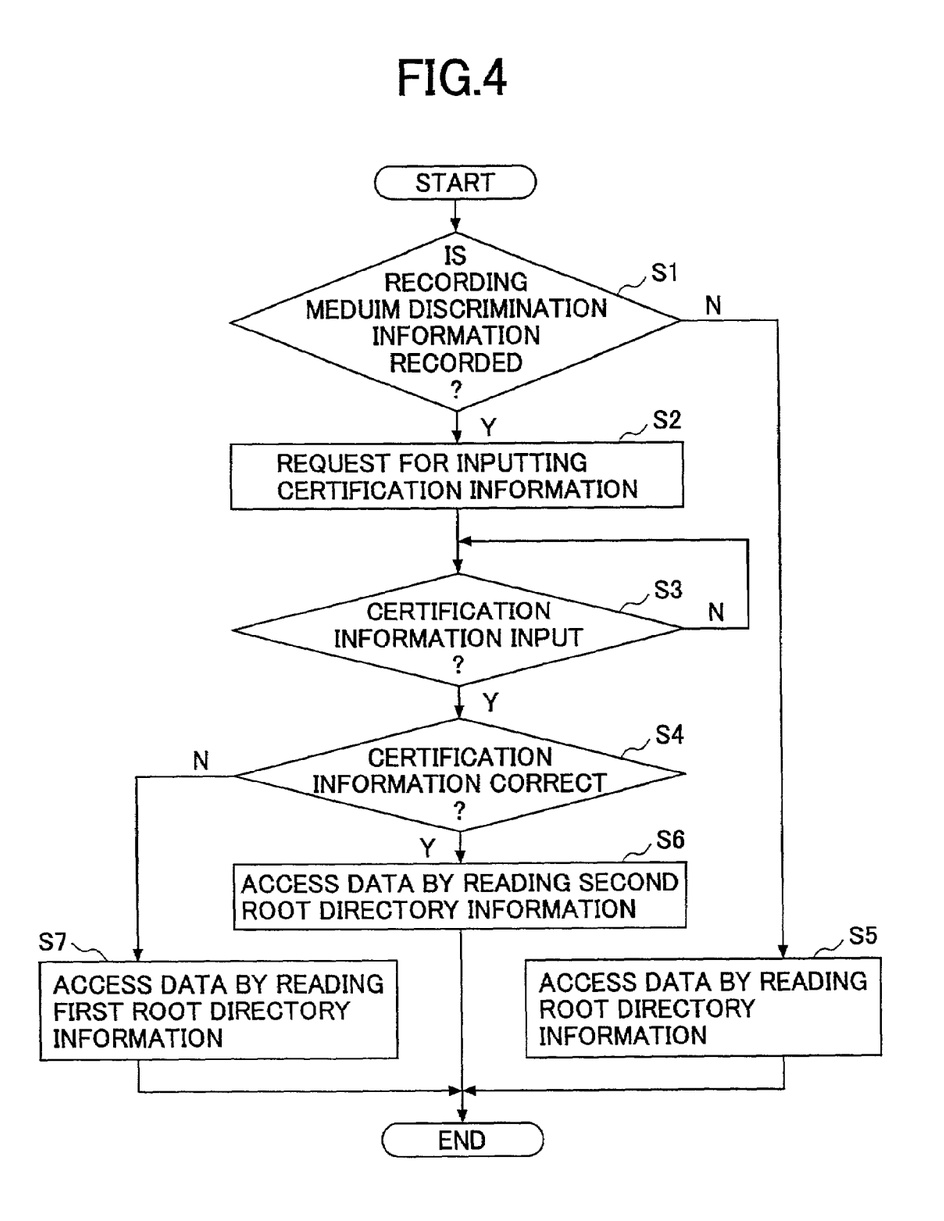
FIG. 4 is a flowchart of a method for accessing an optical disc according to the embodiment of the present invention.

A description will now be given, with reference to FIG. 4, of a method for accessing an optical disc according to the embodiment of the present invention. FIG. 4 is a flowchart of the method for accessing a recording medium according to the present invention.

The routine shown in FIG. 4 starts when the optical disc 1 is loaded to the drive apparatus 2. When the optical disc 1 is loaded to the drive apparatus 2, the drive apparatus sends information to the information processing apparatus 3 via the connecting parts 5 and 7, and thereby the software 12 for using a recording medium is started.

Then, it is determined, in step S1, whether or not the recording medium discrimination information is recorded on the optical disc 1 by reading the section 1e of the optical disc 1. If it is determined that the recording medium discrimination information is not recorded, it is determined that the optical disc 1 is a regular optical disc, and the routine proceeds to step S5. In step S5, the section 1a is read so as to obtain the root directory access information stored in the section 1a, and, thereafter, access the root directory information stored in the section 1b as shown in FIG. 2B.

On the other hand, if the recording medium discrimination information is recorded, the routine proceeds to step S2. In step S2, a request is made to a user to input attestation information such as a password so as to determine whether or not the user is an authorized person. Accordingly, it is determined, in step S3, whether or not the attestation information is input. If no input is given by the user, the process of step S3 is repeated. If the attestation information is input through the input part 10 in response to the request, the routine proceeds to step S4.

Then it is determined, in step S4, whether or not the user is an authorized person by analyzing the attestation information by the analyzing part 11 and comparing the analyzed attestation information with attestation information previously registered in the software 12.

If it is determined that the user is an authorized person, the routine proceeds to step S6. In step S6, the root directory position information stored in the section if is read first, and, then, the second root directory information stored in the section 1*d* is read by referring to the pointer information included in the root directory position information. Thereby, the data recorded on the optical disc 1 can be recognized on a display. That is, the entire directory structure of the data recorded on the optical disc 1 is displayed on the display as shown in FIG. 3. Thus, the user can select any desired file or directory to be accessed. This means that the user is permitted to access the data or information recorded on the optical disc 1.

On the other hand, if it is determined, in step S4, that the user is not an authorized person, the routine proceeds to step S7. In step S7, the root directory access information stored in the section 1*a* is read, and, thereafter, the first root directory information stored in the section 1*c* is read. At this time, since the first root directory information indicates as if only the root directory is present, the directories or files under the root directory cannot be accessed by the user. That is, the user cannot recognize the directories and files under the root directory, thereby preventing an access to the data recorded on the optical disc 1. For example, if the Windows® of Microsoft is installed as the operating software, only the root directory is indicated on the Explore® window. Thus, an authorized person is prohibited from accessing the data recorded on the optical disc 1.

According to the above-mentioned embodiment of the present invention, the data recorded on the optical disc 1 loaded to the drive apparatus 2 is hidden, when an unauthorized person attempts to read the data recorded on the optical disc 1, due to the software 12 effecting the first root directory information, which includes information regarding only the root directory. On the other hand, when the user inputs the correct attestation information and is determined as an authorized person, the user can access the data recorded on the optical disc 1 due to the software 12 effecting the second root directory information, which includes information regarding all directories and files of the data recorded on the optical disc 1.

Figure 5:
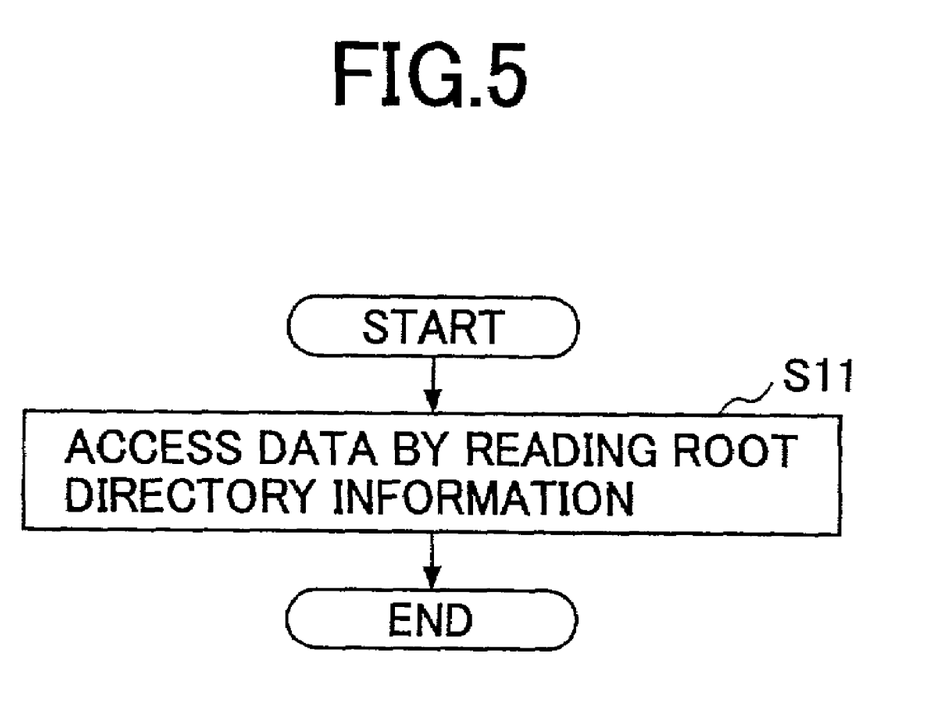
FIG. 5 is a flowchart of a method for accessing an optical disc according to an existing standard.

A description will now be given with reference to FIG. 5, of a case in which the optical disc 1 according to the present embodiment is loaded to a disc drive apparatus which does not have software such as the software 12. FIG. 5 is a flowchart of an operation performed by a disc drive apparatus, which does not have a function to discriminate the optical disc according to the present embodiment.

When the optical disc 1 according to the present embodiment is loaded in a regular disc drive apparatus, the root directory access information is read first since the software of the regular disc drive apparatus does not have a function to discriminate the type of the optical disc and a function to determine whether the user is an authorized person. Accordingly, in step S11, the root directory access information stored in the section or area 1*a* is read in accordance with a regular procedure of reading an optical disc, and, thereby, the first root directory information stored in the section 1*c* is read. Thus, the information regarding only the root directory is displayed, which results in the user being prevented from accessing the directories and files under the root directory. Accordingly, the data recorded on the optical disc 1 cannot be accessed by an unauthorized person using a regular disc drive apparatus.

The present invention is not limited to the specifically disclosed embodiments, and variations and modifications may be made without departing from the scope of the present invention.

The present invention is based on Japanese priority application No.2000-050394 filed on Feb. 28, 2000, the entire contents of which are hereby incorporated by reference.

The invention claimed is:

1. A recording medium storing data having a directory structure, comprising:
    a first section in which a first set of root directory information is recorded, wherein said first set of root directory information is read by a drive apparatus to indicate that only one root directory recorded on the recording medium is only present; and
    a second section in which a second set of root directory information is recorded, said second section being located at a predetermined position different from a position of said first section, and said second set of root directory information is read by said drive apparatus to indicate said root directory and all other directories and all files of the data that exist in said directory structure whose highest-order directory is said root directory and recorded on said recording medium,
    wherein said first set of root directory information is a part of said second set of root directory information.

2. The recording medium as claimed in claim 1, wherein recording medium information is recorded at a predetermined position on said recording medium, the recording medium information indicating whether or not said second set of root directory information is recorded.

3. The recording medium as claimed in claim 1, wherein root directory position information is recorded at a predetermined position on said recording medium, the root directory position information indicating a position of said second section.

4. The recording medium as claimed in claim 1, wherein root directory access information is recorded at a predetermined position, the root directory access information indicating the position of said first section.

5. A method for accessing a recording medium, comprising the steps of:
    discriminating whether said recording medium has both a first set of root directory information and a second set of root directory information, said first set of root directory information being readable by a drive apparatus to indicate only a root directory of data recorded on said recording medium, wherein said first set of root directory information indicates only that a root directory is present, said second set of root directory information indicating said root directory and all other directories and files of the data that exist in the directory structure whose highest-order directory is said root directory and recorded on said recording medium;
    determining whether a person, who is accessing said recording medium, is an authorized person when said recording medium has said second set of root directory information; and
    using said drive apparatus to read root directory position information recorded at a predetermined position on said recording medium only when said person is determined to be the authorized person, the root directory position information indicating a position at which said second set of root directory information is recorded.

6. The method as claimed in claim 5, further comprising a step of reading root directory access information recorded at a predetermined position on said recording medium when said person is determined to be an unauthorized person, the root directory access information indicating a position at which root directory information containing information with respect to only a root directory of the data recorded on said recording medium is recorded.

7. The method as claimed in claim 5, wherein the step of discriminating includes a step of reading recording medium discrimination information recorded at a predetermined position on said recording medium, the recording medium discrimination information indicating whether or not said second set of root directory information is recorded.

8. The method as claimed in claim 5, further comprising a step of reading root directory access information recorded at a predetermined position on said recording medium when said recording medium does not have said second set of directory information, said root directory access information indicating a position at which said first set of root directory information is recorded.

9. The method as claimed in claim 5, wherein the step of determining includes the steps of:

requesting said person to input certification information; and determining whether or not the certification information is correct so that said person is determined to be the authorized person when the certification is correct.

* * * * *